United States Patent [19]

Coleman et al.

[11] Patent Number: 5,328,711
[45] Date of Patent: Jul. 12, 1994

[54] SHELF-STABLE GELLED CONFECTIONS

[75] Inventors: Edward C. Coleman, New Fairfield; Noel E. Anderson, Brookfield, both of Conn.

[73] Assignee: Kraft General Foods, Inc., Northfield, Ill.

[21] Appl. No.: 53,586

[22] Filed: Apr. 27, 1993

[51] Int. Cl.⁵ .................... A23G 3/00; A23L 1/0562
[52] U.S. Cl. .................................... 426/576; 426/660
[58] Field of Search ...................... 426/576, 573, 660

[56] References Cited

U.S. PATENT DOCUMENTS

| | | | |
|---|---|---|---|
| 3,218,176 | 11/1965 | Polya et al. | 426/576 |
| 3,939,001 | 2/1976 | Clausi et al. | 426/576 |
| 4,224,353 | 9/1980 | Kueper et al. | 426/576 |
| 4,710,393 | 12/1987 | Holmgren et al. | 426/660 |

Primary Examiner—Jeanette Hunter
Attorney, Agent, or Firm—Thomas R. Savoie; Thomas A. Marcoux

[57] ABSTRACT

Formulations and processes for shelf-stable, gelled, gelatin confections which have a texture akin to gelatin dessert gels.

6 Claims, No Drawings

SHELF-STABLE GELLED CONFECTIONS

TECHNICAL FIELD

This invention relates to shelf-stable, ready-to-eat, gelatin-containing confections which have a texture akin to that of gelatin dessert gels.

Gelatin gels have long been regarded as desirable dessert items, particularly among children. The short texture and melt-away sensation of gelatin gels are among the reasons these gels are so highly-regarded by consumers. Typical gelatin gels however are not shelf-stable and melt upon standing at room temperature.

BACKGROUND ART

Recently it has been known to produce gelatin gels of somewhat firmer texture for use as snack items. These snacks, known as JELL-O ® gelatin JIGGLERS TM are made by increasing the weight of the gelatin dessert mix which is combined with a given quantity of boiling water by about 60%. These JIGGLERS TM gelatin snacks have a short, somewhat more firm texture than gelatin dessert gels, but are neither room temperature stable in terms of resistance to microbiological growth nor free from melting at room temperature.

It is also known to produce gelatin-containing candies, the candies known as GUMMY BEARS TM being both microbially-stable and non-melting at room temperature, have a tough and chewy texture which is unlike the texture of gelatin desserts and there is little meltaway sensation.

DISCLOSURE OF THE INVENTION

It is an object of this invention to provide a gelatin-containing confection which is shelf-stable, room-temperature stable and can be marketed as a confection.

It is another object of this invention to produce a shelf-stable gelatin-containing confection which yields a melt-in-the-mouth sensation.

It is yet another object to produce a molded shelf-stable gelatin confection which is gel-like in character in that the molded piece has a soft non-rigid structure, and possesses the characteristic "wiggle" of a gelatin dessert gel.

These and other objects are realized by the present invention which provides novel formulations and products and improved processes. The formula for the gelatin confections of this invention include gelatin, water, sucrose, corn syrup, preferably high maltose corn syrup, a humectant such as propylene glycol, glycerine, mannitol and/or sorbitol, preferably glycerine, food acid, flavor and color. The process includes the steps of combining gelatin and water together with the corn syrup, sucrose and humectant and then heating to a temperature of about 220° F. (104.4° C.). The resulting solution is then cooled to about 170° F. (76.7° C.) at which time any undissolved solids which are be present on the surface of the solution may be skimmed off in order to improve the clarity of the end product. Ingredients such as flavors, colors and acids may then be added and the resulting fluid composition is deposited into molds and allowed to cure for from 3 to 36 hours at a temperature of about from 35° F. (1.7° C.) to about 70° F. (21.1° C.) depending upon the texture desired. The set product is then removed from the mold, surface washed with warm water, as necessary, and then coated with an oil and/or wax coating. The resulting product should have a water activity (Aw) of from 0.65 to about 0.85, preferably 0.75 to 0.85, and a pH of 2.0 to 4.6, preferably about 3.0 to about 3.2. The molded pieces have a clarity, texture and wiggle of a gelatin dessert gel.

INDUSTRIAL APPLICABILITY

This invention will be further described below with reference to a specific embodiment. It will be recognized, however, that the invention is not limited thereto and that the formulation can be varied to provide varying textures and flavors and that the process may be modified to provide for more efficient and/or automated operation.

According to the practice of this invention a gellable formulation is prepared with the following ingredients:

| Ingredient | % By Weight |
| --- | --- |
| Gelatin (150–300 Bloom) | 3–9 |
| Water | 25–40 |
| Corn Syrup | 30–45 |
| Sucrose | 12–30 |
| Humectant | 2–6 |
| Food Acid | 0.5–4 |
| Flavor/Color | (as desired) |

Preferred formulation parameters include the use of type B (i.e., alkali-treated) gelatin and high maltose corn syrup. The food acid is preferably citric acid; however, other conventional food acids or acid blends such as adipic and/or fumaric may be employed. Ascorbic acid may be included as part of the food acid component if vitamin fortification is desired.

According to a procedure for making the gelatin confections of this invention gelatin powder is soaked at room temperature in about ⅔ of the formula water for about 30 minutes. This gelatin soaking step has been found to improve the clarity and smoothness of the confection. High-maltose corn syrup, sucrose, glycerine and the balance of the water are separately mixed and heated until the sucrose is fully dissolved. The gelatin slurry and heated solution are then mixed and heated to a temperature of 220° F. (104.4° C.). The resulting mixture is allowed to cool to about 170° F. (76.7° C.) at which point, if any undissolved gelatin solids are present, the top layer of the mixture is skimmed off in order to improve the clarity of the gelatin confection. Flavor, color and acid components are then added to the clarified solution and this solution is then deposited into impressions made in a bed of powdered starch. Typically this starch will have a moisture content of about 6 to 8%. The gelatin solution is allowed to cure over a period of 3 to 36 hours at temperature of from 35° F. (1.7° C.) to 70° F. (21.1° C.) depending on the desired texture with shorter times and lower temperatures giving softer texture and longer times and higher temperatures giving firmer textures.

After curing, the pieces are removed from the starch impressions, sprayed with warm water and/or steam in order to remove from the surface any solubilized or adhering starch and then immediately coated with a blend of oil (e.g., vegetable oil) and/or wax (e.g., carnauba and/or bees wax). The products will preferably have a pH of from 3.0 to 3.2, a solids content of from 63 to 72% and an $A_w$ of from 0.75 to 0.85. The confections have a desirable gelatin dessert gel-like texture and wiggle.

EXAMPLE

Utilizing the procedure described immediately above, gelled gelatin confections were made with the following ingredients.

| Ingredient | Grams |
| --- | --- |
| Gelatin (225 Bloom, Type B) | 45.4 |
| Water | 295.2 |
| High Maltose Corn Syrup (43DE, 81–84% solids) | 340.4 |
| Sucrose | 184.4 |
| Glycerine | 42.6 |
| Flavor/Color | 11.9 |
| Citric Acid (50% aqueous solution) | 13.6 |
| Vitamin C | 1.2 |

Curing conditions were 60° F. (15.5° C.) for 6 hours. The resulting confection had a solids content of 68%, and $A_w$ of 0.78 and a pH of 3.05. The resulting confections possessed the organoleptic characteristics of gelatin dessert gels and were shelf-stable in terms of structure, texture and microbial growth. The confections provided a pleasant eating experience at either room temperature or refrigerator temperature. These products can thus be distributed, marketed or eaten at either ambient or refrigerator conditions.

Having thus described the invention what is claimed is:

1. A room-temperature stable, gelled, gelatin confection having a solids content of from 63 to 72%, an Aw of 0.65 to 0.85, and a pH of from 2.0 to 4.6, said confection being comprised of 3 to 9% gelatin, 20 to 40% water, 30 to 45% corn syrup, 12 to 30% sucrose, 2 to 6% humectant and 0.5 to 4% food acid.

2. The confection of claim 1 wherein the pH is from 3.0 to 3.2.

3. The confection of claim 1 wherein the corn syrup is high maltose corn syrup.

4. The confection of claim 1 wherein the food acid comprises citric acid.

5. The confection of claim 1 wherein the humectant is glycerine.

6. The confection of claim 1 wherein the $A_w$ is 0.75 to 0.85.

* * * * *